E. E. LAWRENCE.
DOUGH PRODUCT CUTTING MECHANISM.
APPLICATION FILED MAR. 25, 1916.
1,204,671.
Patented Nov. 14, 1916.
3 SHEETS—SHEET 1.
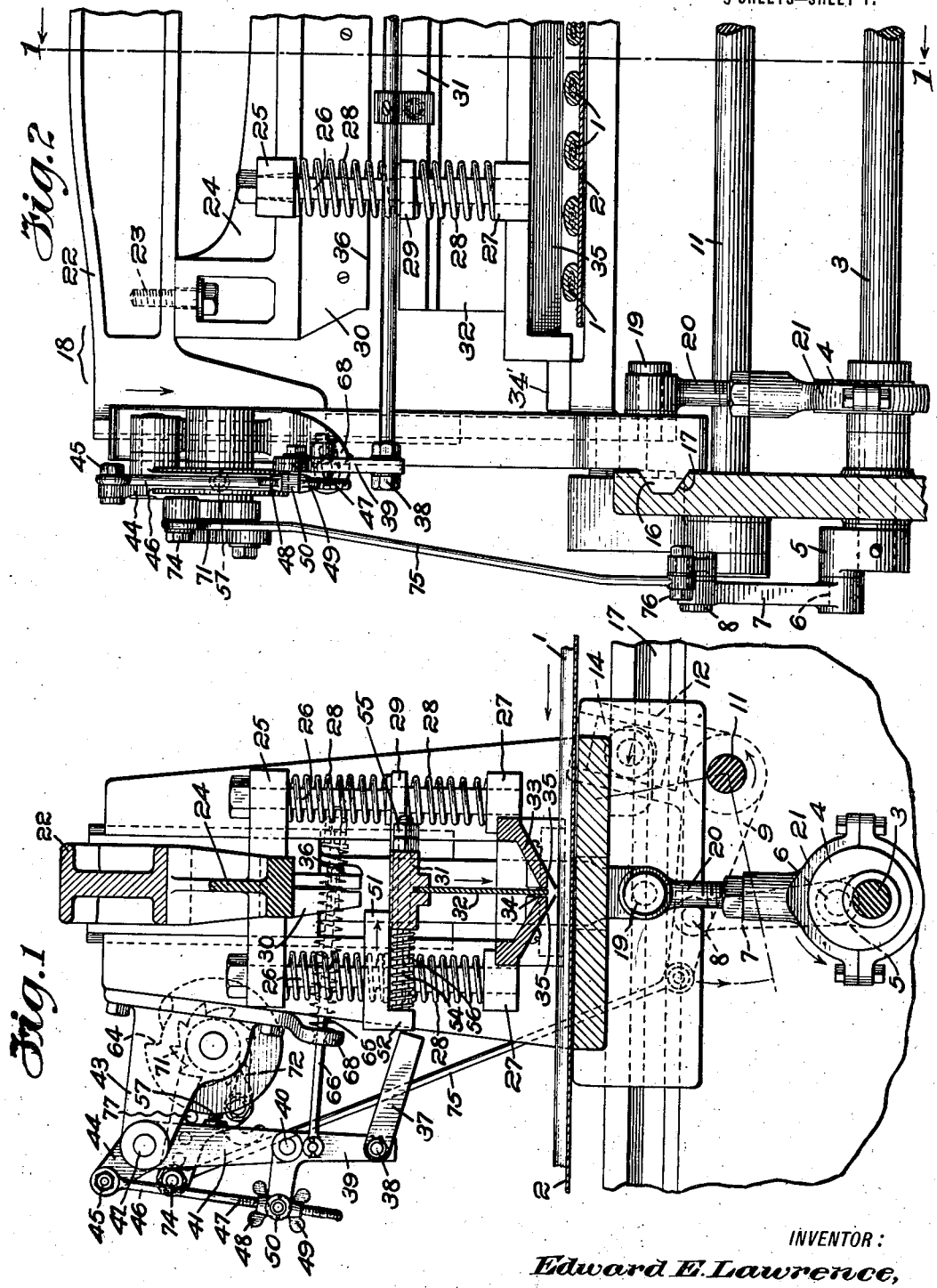
INVENTOR:
Edward E. Lawrence,
by Emery, Booth, Janney & Varney
ATTORNEYS.

E. E. LAWRENCE.
DOUGH PRODUCT CUTTING MECHANISM.
APPLICATION FILED MAR. 25, 1916.
1,204,671.
Patented Nov. 14, 1916.
3 SHEETS—SHEET 2.
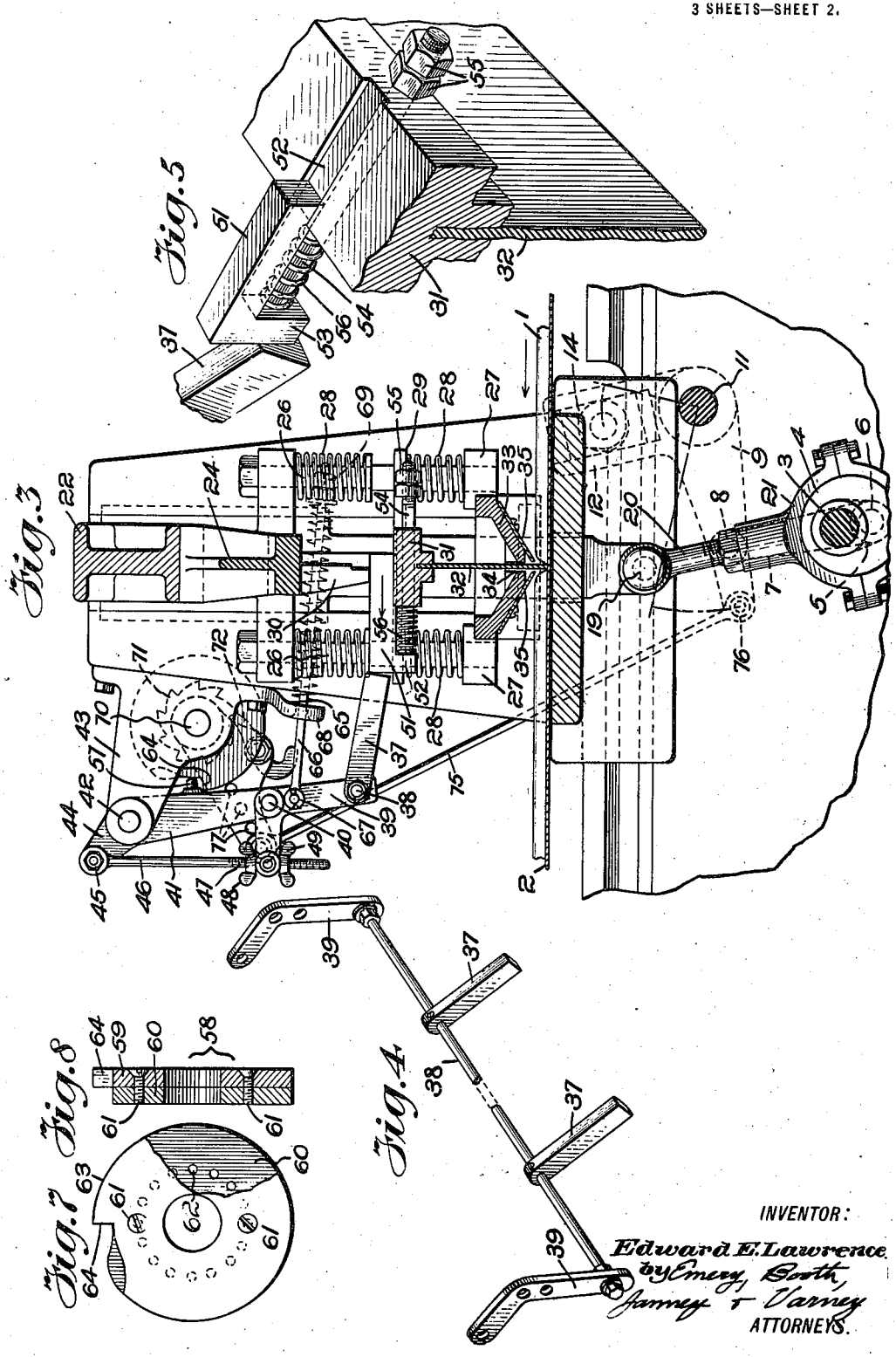
INVENTOR:
Edward E. Lawrence
by Emery, Booth,
Janney & Varney
ATTORNEYS.

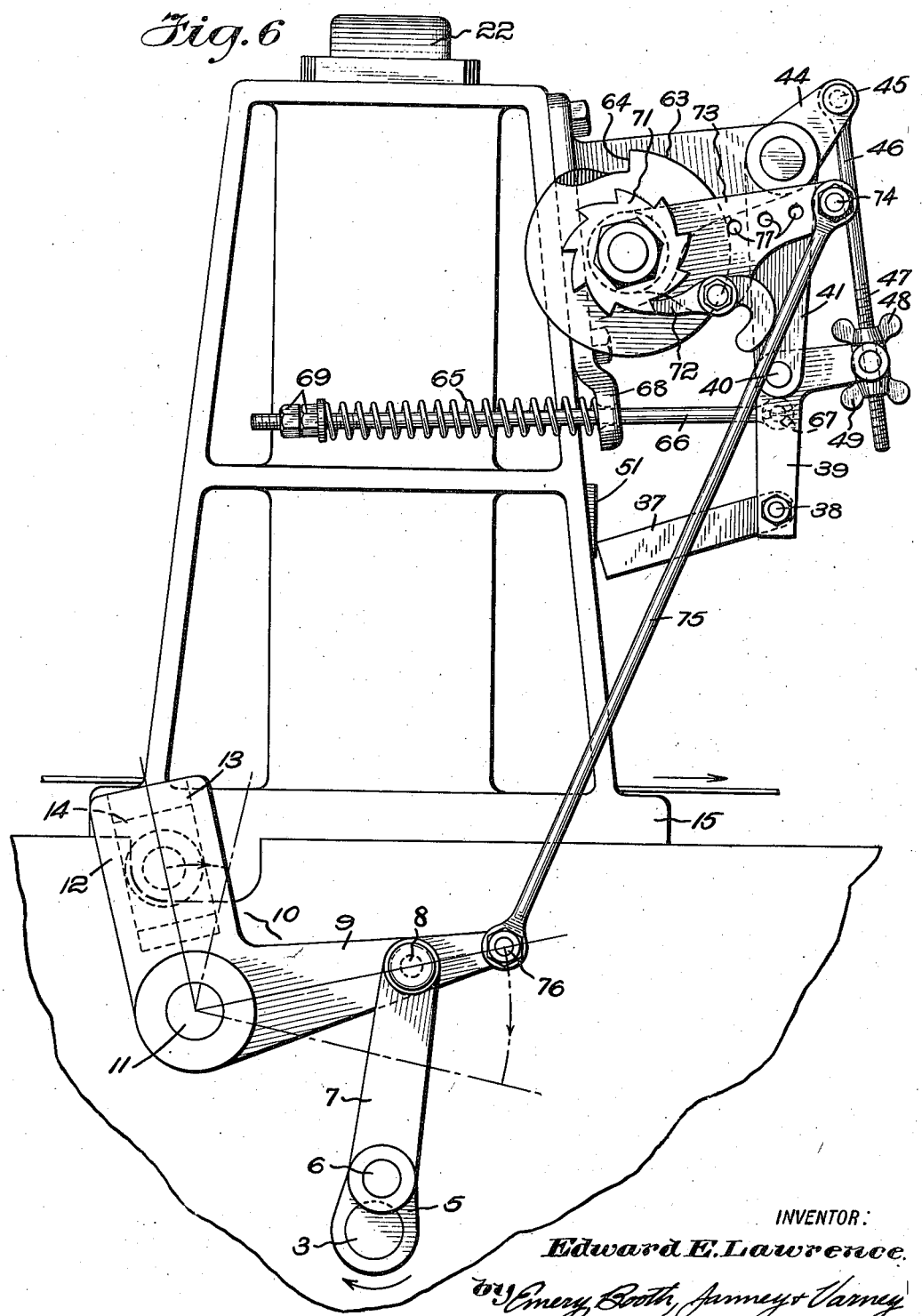

UNITED STATES PATENT OFFICE.

EDWARD E. LAWRENCE, OF JAMAICA, NEW YORK, ASSIGNOR TO LOOSE-WILES BISCUIT COMPANY, OF LONG ISLAND CITY, NEW YORK, A CORPORATION OF NEW YORK.

DOUGH-PRODUCT-CUTTING MECHANISM.

1,204,671.  Specification of Letters Patent.  Patented Nov. 14, 1916.

Application filed March 25, 1916. Serial No. 86,792.

*To all whom it may concern:*

Be it known that I, EDWARD E. LAWRENCE, a citizen of the United States, and a resident of Jamaica, in the county of Queens and State of New York, have invented an Improvement in Dough-Product-Cutting Mechanism, of which the following description, in connection with the accompanying drawings, is a specification, like characters on the drawings representing like parts.

This invention relates to mechanism for cutting dough products of various descriptions, and particularly to means for cutting fig bars fed in a plurality of substantially parallel lengths.

In order that the principle of the invention may be readily understood, I have disclosed a single embodiment thereof in the accompanying drawings, wherein—

Figure 1 is a vertical section on the line 1—1 of Fig. 2 looking toward the left in said figure, the cutting parts being shown in said figure, the cutting parts being shown in inoperative position; Fig. 2 is a view partially in front elevation and partially in vertical section, of the mechanism shown in Fig. 1 and looking toward the rear or delivery end of the machine; Fig. 3 is a view similar to Fig. 1, but representing the cutting parts in their operative or cutting position; Fig. 4 is a detail in perspective of the pusher fingers of the cutting mechanism and their co-acting connections; Fig. 5 is a detail in enlarged perspective of the cutter bar carrier showing a portion of a pusher finger in operative relation to their co-acting parts; Fig. 6 is a side elevation upon an enlarged scale of the cutting mechanism, the operating means therefor, and the side frame of the machine upon which the same are mounted; and Figs. 7 and 8 are respectively a side elevation, partially broken away, and a vertical section of a pair of relatively adjustable cams controlling the timing of the cutting mechanism.

This invention relates generally to cutting mechanism for dough products, more especially to dough products fed in continuous lengths and particularly to bars known upon the market as "fig newtons", and which are fed in a plurality of lengths in general parallelism. Heretofore such fig newton bars have been severed by hand, the desired length being measured off by the attendant. This action has been slow, expensive and unsatisfactory. I have produced a cutting mechanism whereby a plurality of such bars may be fed at a rapid rate and may be severed automatically into the proper lengths, such lengths being varied as desired.

The product to which my invention more particularly relates, but to which it is in no wise limited, is one composed of raw fig jam inclosed in dough. Certain of these bars are indicated at 1 in Fig. 2. The bars are supported upon a horizontal belt 2, but a small portion of which is shown and which may be and is driven in any suitable manner. I have not herein indicated the preferred manner of driving the belt 2 nor the means for supplying the dough product thereto, inasmuch as these may be varied within the scope and purpose of my invention. The dough product after severance is suitably baked in a manner not herein necessary to disclose.

Upon the frame work of the machine is mounted in suitable bearings a shaft 3 driven from any suitable source and having thereon an eccentric 4 and a crank arm 5. Pivotally connected at 6 to the crank arm 5 is a link 7 which is pivotally connected at 8 to an arm 9 of a bell crank lever 10 mounted at 11 upon the framing of the machine and having an upright arm 12 provided with a recessed portion 13 in which is mounted for slight relative movement a block 14 connected to a frame 15 having a sliding movement with the belt 2 at the same rate of travel as the latter and also a return movement in opposition to the feed of said belt. The frame 15 may be of any suitable character. It is, however, preferably provided with lateral flanges, one of which is indicated at 16 received in corresponding longitudinal grooves 17 in the framing of the machine. Upon the said frame 15, which mainly comprises two upright side members, is mounted for vertical reciprocation the cutter carrier 18, the vertical edges whereof are received for sliding movement in suitable grooves in the members of the cutter frame. A movement of vertical reciprocation is imparted in any suitable manner to the said cutter carrier. For that purpose, I have herein represented the cutter carrier as having inwardly extending from its lower end a pin 19 pivotally connected to which is a link 20 of variable length, itself connected to the eccentric strap 21 whereby in each rotation of the shaft 3 the eccentric 4 imparts a movement of vertical reciprocation to the cutter carrier.

The cutter carrier 18 is herein shown as having an upper transverse part 22 to which is secured by suitable bolts 23 a transverse part 24, the latter having supported thereon and extending in the direction of the travel of the belt 2 a plurality of bars or members 25 receiving therein the upper ends of bolts 26. These bolts are headed at their upper ends and their lower, unheaded ends extend through corresponding projections 27. Surrounding the said bolts 26 are coil springs 28, each of which is preferably composed of two parts separated by guiding members 29.

The construction and relation of parts thus far described are such that upon vertical reciprocation of the cutter carrier 18, the members 22 and 24 are vertically moved and the bolts 26 reciprocate in the sockets in the extensions 27 compressing the springs in its action, but not resulting in a complete cutting operation and do not cut into the fig bars or other products.

The cutter carrier 18 is provided with a depending portion 30 and positioned below the same is the cutter carrier proper or secondary carrier 31 in the lower face of which is suitably secured the vertically positioned cutter blade 32. The cutter carrier proper 31 is provided with the lateral guiding extensions 29 heretofore referred to, and therefore is supported by the lower portions of the coil springs 28, thereby tending to maintain the cutter out of cutting relation to the fig bars 1. The lower edge of the cutter blade 32 is guided in and passes through a trough-like member 33 having a vertical slot 34. The said trough-like member 33 has laterally extending therefrom the said projections 27 and is provided at opposite ends with laterally extending feet 34' one of which is shown in Fig. 2 and which are screwed or otherwise secured to the portion of the cutter carrier underlying the belt 2. Secured to the under side of said trough-like member are blade clearers 35 which upon the upward movement of the cutter blade 32 remove the dough product therefrom and prevent any displacement of the latter. The trough-like member 33 is adapted to receive a small quantity of any suitable material to lessen the tendency of the dough product to adhere to the severing blade 32. If it be found that the dough product tends to adhere to the severing blade, a small quantity of starch or some other suitable material may be placed in the trough-like member 33, through which the severing blade 32 moves.

The lower edge 36 of the depending portion 30 is sufficiently spaced from the upper face of the cutter carrier proper 31 that in the downward movement of the cutter frame 18, said parts do not contact at all or only during such a brief period that no downward movement is imparted to the cutter carrier proper, or but a slight and incomplete cutting movement is imparted thereto, and hence to the cutter blade 32.

In the disclosed embodiment of my invention, the positioning of the parts is such that upon each downward movement of the cutter frame 18, the depending portion 30 comes in contact with the upper face of the cutter carrier proper 31 only after considerable lost movement, and hence only an incomplete cutting movement is imparted to the cutter blade 32 unless the cutter carrier and the cutter carrier proper be caused to partake of unison movement. Such unison movement may within the broad scope and purpose of my invention be effected in various ways, but herein such movement is effected by the provision of one or more parts or elements which are adapted to be interposed between the cutter carrier and the cutter carrier proper, so that the two parts move as one and a complete cutting movement of the cutter blade is effected. It is evident that with the organization of parts herein shown, if the cutter blade were given an effective stroke for every downward movement of the cutter carrier 18, the fig bars 1 would be cut into very short lengths. Preferably the construction is such that a plurality of incomplete cutting movements are imparted to the cutter blade for every complete cutting movement thereof, and in the disclosed organization of parts I provide for as many as seven or eight incomplete cutting movements of the cutter blade to every complete cutting movement thereof. I thus sever the bars into lengths which may be as great as desired, and with the mechanism herein disclosed is frequently as much as forty-two inches. These bars are intended to be subsequently fed through a suitable machine whereby they are severed, after baking, into shorter lengths.

In order to effect the described unison movement of the cutter carrier and the cutter carrier proper, I have herein provided a series of so-called fingers 37 of any suitable number and which are fast upon a transverse rod 38 secured by suitable nuts upon its ends to a pair of bell crank levers 39 pivoted for adjustment at 40 upon the lower ends of two depending arms 41 of levers themselves pivoted at 42 upon brackets 43 laterally extending from the side of the cutter frame. The said levers have upwardly extending arms 44 to which are suitably secured at 45 depending rods 46 having threaded ends 47 receiving thereon wing nuts 48, 49. Between said wing nuts 48, 49 are received the outer ends 50 of the bell crank lever 39. The construction and relation of parts are such that by adjustment of the wing nuts 48, 49 the bell crank levers 39 may be swung upon their pivots 40 and the position of the fingers 37 suitably changed.

The fingers 37 are adapted to act upon a corresponding number of slide members 51 which, as most clearly shown in Fig. 5, are mounted in grooves 52 in the upper surface of the cutter carrier proper 31. Each of said slide members is provided with a depending portion 53 and inwardly extending therefrom is a bolt or pin 54 extending laterally through the said cutter carrier proper 31 and provided with nuts 55. Surrounding each bolt or pin 54 between the depending portion 53 and the cutter carrier proper is a coil spring 56 tending normally to hold the corresponding slide member 51 in its inactive position represented in Figs. 1 and 5, but yielding to permit the slide member to be slid inwardly through the action of the fingers 37 as illustrated in Fig. 3. The vertical height of the slide members 51 is such that when they are positioned as indicated in Fig. 3 the depending portion 30 of the cutter carrier contacts immediately therewith upon the downward movement of the cutter carrier, and hence said cutter carrier and cutter carrier proper have a unison movement; that is, they move as a single rigid part, and hence impart a complete cutting movement to the cutter blade 32, thus severing the bars 1.

In order to impart movement to the fingers 37, I have herein represented one of the levers 41 as having an inwardly extending pin 57 adapted to bear against the edge of a substantially circular cam 58 which, as indicated in Figs. 7 and 8, is composed of two annuli 59, 60 adapted to be secured together by screws 61 in the annulus 59 and adapted to take into any desired holes 62 in the annulus 60, whereby the configuration of the cam may be varied. The annulus 59 is provided with a curved surface 63 terminating in a radial shoulder 64, and in the rotation of the cam in the direction of the arrow adjacent thereto in Fig. 7, the pin 57 rides upon the curved surface 63 and finally moves inwardly at the shoulder 64 under the stress of any suitable means. For this purpose, I have herein represented a coiled spring 65 surrounding a link 66 pivoted at 67 to one of the levers 41. The link 66 passes through an opening in a guiding portion 68 of the bracket 43, and at its outer end is provided with nuts 69, the coil spring 65 being compressed between the parts 68, 69, whereby the tendency of the spring is to move inward, viewing Fig. 3, the lever 41 and the fingers 37 supported and carried thereby.

The cam 58 is mounted for intermittent rotation upon a stud shaft 70 carried by the bracket 43. Fast upon said stud shaft is a ratchet 71 with which engages a pawl 72 upon a lever arm 73 loosely mounted upon said stud shaft and having pivotally connected to its outer end at 74 a link 75 which at its lower end 76 is pivotally connected to the arm 9 of the lever 10, so that in the movement of said arm imparted thereby by the crank 5 upon the shaft 3, a movement of intermittent rotation is imparted to the cam 58. I have herein represented the lever arm 73 as having a plurality of holes 77 in any one of which the link 75 may be pivoted according to the amount of movement that it is desired to impart to said lever arm at each rotation of the shaft 3.

From the foregoing description, it will be evident that the cutter frame is movable with the belt 2 in the direction of travel thereof. It is also movable therewith at the same rate of speed, so that when the cutter blade 32 penetrates the bars 1, it severs the same without any buckling of the material. The return movement of the cutter frame is effected when the cutter blade 32 is out of contact with the bars or other dough product 1. The cutter carrier receives a movement of complete vertical reciprocation for each rotation of the shaft 3, but it is only upon each complete rotation of the cam 58 that a complete cutting movement is imparted to the cutter blade 31. The false or non-penetrating movements of the cutter blade do not bring said cutter blade into contact with the bars 1 or other dough product. By adjusting the members of the cam 58, the length of the bars may be varied. The adjustment effected through the wing nuts 48, 49 is for the purpose of securing the proper correlation of the fingers 37 and the slides 51. The cam 58 having been set for a predetermined length of bars, it is merely necessary to supply the dough material to the feed belt 2, the dough material being thereafter automatically severed in equal lengths so long as the machine continues in operation.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A dough or like product treating mechanism provided with means to feed the product, a cutter carrier, a cutter operatively related thereto, means to move the cutter carrier periodically with the product, lost motion connections between said cutter carrier and cutter, means for moving said cutter carrier toward and from said product feeding means, and means for periodically neutralizing the effect of said lost motion connections, whereby one only of a series of movements of the cutter carrier effects penetration by the cutter of the dough or other products.

2. A dough or like product treating mechanism having a cutter carrier, a cutter operatively related thereto, lost motion connections between said cutter carrier and cutter, means for moving said cutter carrier toward and from said product, said lost motion connections being such that upon false strokes the cutter does not contact with the material, and means for periodically neutralizing the effect of said lost motion connections, whereby one only of a series of movements of the cutter carrier effects penetration by the cutter of the dough or other product, and the product is not disturbed by the other or false movements of said series of movements.

3. A dough or like product treating mechanism comprising means to feed longitudinally of the mechanism a series of substantially parallel bars of dough-like material, and means movable longitudinally of said mechanism and also movable automatically to sever said bars into predetermined lengths, said means including a cutter carrier comprising a movable member, a severing blade carried thereby, a second member spaced from and having movement relative to the first, and means periodically to effect conjoint movement of said members.

4. A dough or like product treating mechanism comprising means to feed longitudinally of the mechanism a series of substantially parallel bars of dough-like material, means movable longitudinally of said mechanism and also movable automatically to sever said bars into predetermined lengths, said means including a cutter carrier, a cutter operatively related thereto, and lost motion connections between said carrier and cutter, and means to vary said lengths.

5. A dough or like product treating mechanism comprising means to feed longitudinally a series of substantially parallel bars of dough-like material, and means traveling in a right line with said feeding means to sever said bars in predetermined lengths, said means including a cutter carrier, a cutter operatively related thereto, means for periodically effecting relative movement between said carrier and cutter, and means for periodically effecting unison movement thereof.

6. A dough or like product treating mechanism comprising means to feed longitudinally a series of substantially parallel bars of dough-like material, and severing means to sever said bars into predetermined lengths, said severing means having a traveling movement in a right line with the feeding means and also in opposition thereto, said severing means including a cutter carrier, a cutter carrier proper having a severing blade, and means to effect differential or unison movement of said cutter and carrier proper.

7. A dough or like product treating mechanism comprising a belt adapted to feed longitudinally a series of substantially parallel bars of dough-like material, and severing means for said material having a movement in an upright plane to and from said belt, and also a movement longitudinally of and substantially in unison with said belt, said severing means including a cutter carrier, a cutter carrier proper having a severing blade, and means for periodically only effecting unison movement of said carrier and carrier proper.

8. A dough or like product treating mechanism comprising means to feed longitudinally a series of substantially parallel bars of dough-like material, means automatically to sever said bars into predetermined lengths, means to cause said severing means to travel with said bars during the severing operation, said severing means including a cutter carrier, a cutter carrier proper having a severing blade, and means to effect differential or unison movement of said carrier and carrier proper, and means to clear the severing means of the dough-like material.

9. A dough or like product treating mechanism comprising means to feed dough-like material longitudinally and a severing blade carrier comprising two parts, one of which has movement relative to the other, to effect a non-cutting movement of the severing blade insufficient to contact with the surface of the dough-like material, means to cause said parts also to move in unison to effect the cutting of the material by said severing blade, and means to cause said severing blade to travel with the material feeding means.

10. A dough or like product treating mechanism comprising means to feed dough-like material longitudinally, and a severing blade carrier having two parts spaced one from the other and movable relative to each other, a member, and means periodically to insert said member between said parts, and thereby to cause conjoint movement of said parts.

11. A dough or like product treating mechanism comprising means to feed dough-like material longitudinally, a cutter carrier comprising a movable member, a severing blade carried thereby, and a second member spaced from and having movement relative to the first, and means periodically to effect conjoint movement of said members.

12. A dough or like product treating mechanism comprising in combination, a traveling support for the dough product, a cutting frame having movement with said support, a cutter carrier, and a cutter carrier proper having a severing blade, and means to impart differential or unison movement to said carrier and carrier proper.

13. A dough or like product treating mechanism comprising in combination, a product support, a cutter carrier, a cutter carrier proper having a severing blade, means periodically positionable between said carrier and carrier proper to effect unison movement thereof, means for intermittently positioning said unison effecting means between said carrier and carrier proper and means for moving the carrier toward and from the support.

14. A dough or like product treating mechanism comprising a product support, a cutter carrier, a cutter carrier proper having a severing blade, a member positionable between said carrier and carrier proper, a finger adapted periodically to position said member between said parts, and means to operate said finger.

15. A dough or like product treating mechanism comprising in combination, a product support, a cutter carrier, a cutter carrier proper having a severing blade, a member adapted to slide into position between said carrier and carrier proper, a finger adapted to impart sliding movement to said member, and means to impart periodic movements to said finger.

16. A dough or like product treating mechanism comprising in combination, a product support, a cutter carrier, a carrier proper having a cutting blade, a member periodically positionable between said parts to effect unison movement thereof, means intermittently to position said member therebetween, and cam means controlling the movement of said last mentioned means.

17. A dough or like product treating mechanism comprising in combination, a traveling dough product support 2, a cutter frame 15 mounted thereabove, means to move said frame periodically with said support, a cutter carrier 18, a cutter carrier proper 31 positioned below and spaced therefrom, and having a cutter 32, means to impart movement of vertical reciprocation to said carrier and carrier proper without bringing said cutter into contact with the dough product, a member 51 positionable between said carrier and carrier proper to cause unison movement of said carrier and carrier proper and the consequent cutting of the dough product, and means adapted to act upon said member to position it between said parts.

18. A dough or like product treating mechanism comprising in combination, a support 2, a cutting frame, a cutter carrier 18, a cutter carrier proper 31 having a cutting blade, a member 51 positionable between said parts, a finger 37 to operate said member 51, and cam means 58 to operate said finger.

19. A dough or like product treating mechanism comprising means to feed longitudinally of the mechanism a series of substantially parallel bars of dough-like material, and means movable longitudinally of said mechanism automatically to sever said bars in predetermined lengths, said means including a cutter carrier, a cutter operatively related thereto, lost motion connections between the carrier and cutter, and means for periodically neutralizing the effect of said lost motion connections.

In testimony whereof, I have signed my name to this specification, in the presence of two subscribing witnesses.

EDWARD E. LAWRENCE.

Witnesses:
  Jos. E. ANDERSON,
  Jos. MELLON.